(12) United States Patent
Nakanishi

(10) Patent No.: US 6,972,809 B2
(45) Date of Patent: Dec. 6, 2005

(54) PATH SHIFTING OPTICAL DEVICE HAVING POLARIZATION CORRECTING SECTION AND OPTICAL DISPLAY SYSTEM INCLUDING SAME

(75) Inventor: Hiroshi Nakanishi, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 50 days.

(21) Appl. No.: 10/321,350

(22) Filed: Dec. 18, 2002

(65) Prior Publication Data

US 2003/0128321 A1 Jul. 10, 2003

(30) Foreign Application Priority Data

Dec. 20, 2001 (JP) .............................. 2001-387027
Apr. 8, 2002 (JP) .............................. 2002-104624

(51) Int. Cl.[7] ..................... G02F 1/1335; G02F 1/13; G02B 5/30; G09G 3/20
(52) U.S. Cl. ..................... 349/5; 349/117; 349/193; 359/495; 345/56
(58) Field of Search ..................... 349/5, 9, 11, 117, 349/193; 359/495, 494; 345/32, 56

(56) References Cited

U.S. PATENT DOCUMENTS

| | | | | |
|---|---|---|---|---|
| 3,825,348 | A | * | 7/1974 | Nomarski et al. .......... 356/484 |
| 4,461,543 | A | * | 7/1984 | McMahon .................. 359/320 |
| 4,984,091 | A | | 1/1991 | Murata ....................... 386/42 |
| 5,053,755 | A | * | 10/1991 | Smith et al. .................. 345/7 |
| 5,161,042 | A | | 11/1992 | Hamada ....................... 349/95 |
| 5,490,006 | A | * | 2/1996 | Masumoto et al. ......... 349/117 |
| 5,506,701 | A | * | 4/1996 | Ichikawa ..................... 359/15 |
| 5,969,832 | A | | 10/1999 | Nakanishi et al. ............ 359/15 |
| 6,061,103 | A | | 5/2000 | Okamura et al. ........... 348/767 |
| 6,222,672 | B1 | * | 4/2001 | Towler et al. .............. 359/465 |
| 6,317,527 | B1 | * | 11/2001 | Yelamarty .................... 385/11 |
| 6,384,816 | B1 | * | 5/2002 | Tabata ........................ 345/204 |
| 2003/0095092 | A1 | * | 5/2003 | Kume et al. .................. 345/87 |

FOREIGN PATENT DOCUMENTS

| | | | |
|---|---|---|---|
| JP | 54-47632 | * | 4/1979 |
| JP | 1-302385 A | | 12/1989 |
| JP | 4-63332 A | | 2/1992 |

* cited by examiner

*Primary Examiner*—Tarifur R. Chowdhury
(74) *Attorney, Agent, or Firm*—Birch, Stewart, Kolasch & Birch, LLP

(57) ABSTRACT

An optical device includes an optical path shifter that has at least one optical path shifting section. The optical path shifting section includes: a polarization modulator for changing the polarization state of an incoming light ray; and a birefringent element for shifting the optical path of an outgoing light ray of the polarization modulator based on the polarization state of the outgoing light ray. The optical device further includes a polarization corrector, which selectively changes the polarization state of an outgoing light ray of the optical path shifter, thereby keeping the polarization state of an outgoing light ray of the polarization corrector substantially unchanged no matter where the optical path has been shifted.

26 Claims, 13 Drawing Sheets

PATH SHIFTING OPTICAL DEVICE HAVING POLARIZATION CORRECTING SECTION AND OPTICAL DISPLAY SYSTEM INCLUDING SAME

BACKGROUND OF THE INVENTION

1. Field of the Invention

The present invention relates to an optical path shifter that can be used to physically shift, displace, or change the location at which an optical output signal is presented to another location in a head mounted display (HMD) or a projection type display system (i.e., projector) and also relates to an optical display system including such an optical path shifter.

2. Description of the Related Art

A liquid crystal display (LCD) includes a pair of substrates and a liquid crystal layer that is sandwiched between the substrates. Multiple pixel electrodes are regularly arranged in columns and rows (i.e., in matrix) on one of the two substrates. A drive voltage, representing an image signal, is applied to each of the pixel electrodes. Upon the application of this voltage, the optical properties (i.e., transmittance and reflectance) of the liquid crystal layer change on a pixel-by-pixel basis. Thus, an image, character and so on can be displayed on the LCD.

The methods of applying different drive voltages to the respective pixel electrodes on the substrate independently include a "simple-matrix addressing" method and an "active-matrix addressing" method.

In the active-matrix addressing method, multiple switching elements are provided on the substrate for the respective pixel electrodes. A substrate including those switching elements thereon is normally called an "active-matrix substrate". On the active-matrix substrate, each of those switching elements selectively turns ON or OFF to electrically connect or disconnect its associated pixel electrode to/from its associated signal line. A metal-insulator-metal (MIM) element or a thin-film transistor (TFT) may be used effectively as such a switching element.

In its OFF state, the switching element needs to have the highest possible electrical resistance. However, if the switching element in OFF state is exposed to intense radiation, then the electrical resistance of the switching element decreases to generate leakage current. As a result, the electrical charge that has been stored in its associated pixel electrode is lost partially. Also, in that case, a drive voltage at an appropriate level cannot be applied to the pixel electrode. Then, the LCD cannot conduct the display operation as intended. For example, even in its black display mode, the LCD leaks some light unintentionally to decrease the resultant contrast ratio thereof.

In an LCD of a transmission type, an opaque layer, which is often called a "black matrix", is provided either over the active-matrix substrate or over a counter substrate, which faces the active-matrix substrate by way of the liquid crystal layer, to overcome these problems. However, when the black matrix is provided, the aperture ratio (i.e., the ratio of the total transmitting area to the overall display area) of pixels decreases adversely. To increase the definition sufficiently by reducing the total area of the black matrix, the switching elements or interconnection lines may be downsized. In that case, however, the driving force may decrease or the wiring resistance may increase. Furthermore, considering various constraints on the actual manufacturing process of LCDs, it is currently difficult to further reduce the sizes of the switching elements or interconnection lines.

To increase the screen resolution by utilizing the non-display areas on the black matrix more efficiently, the image being displayed may be optically shifted, or displaced, by a distance that is approximately equal to one pixel pitch. Such an optical shifting technique is disclosed in U.S. Pat. No. 4,984,091, for example. According to this technique, as the pixels are shifted, the image being displayed is also shifted to a location corresponding to the pixels shifted. Thus, the apparent number of pixels increases, and therefore, even a low-resolution display panel can also display an image having a resolution comparable to that of a high-resolution display panel.

U.S. Pat. No. 6,061,103 discloses a method of getting three groups of pixels, representing the three primary colors of red (R), green (G) and blue (B) (which will be herein referred to as "R, G and B pixels", respectively), displaced optically by a shifter one after another and then displaying a superimposed, composite image consisting of three image components represented by the three groups of pixels shifted. In this method, the R, G and B pixels are displayed time sequentially in the same area corresponding to one pixel. Accordingly, the apparent resolution can be tripled without reducing the pixel pitch on the display panel.

U.S. Pat. No. 6,061,103 also discloses an optical path shifter, including a liquid crystal cell and a birefringent element in combination, as a means for displacing the image optically. The birefringent element is made of a material that refracts incoming light in a different direction depending on the polarization direction of the incoming light. Thus, if the polarization direction of the light that is going to enter the birefringent element has been changed by the liquid crystal cell, then the optical axis of the light (i.e., propagation direction of the light) that is leaving the birefringent element can be shifted.

FIG. 1 illustrates the known optical path shifter. As shown in FIG. 1, this optical path shifter includes a liquid crystal cell 10 and a birefringent element 12, which are arranged in series in the direction in which incoming light is propagated. The liquid crystal cell 10 may switch from the state of rotating the plane of the electric vector (which will be herein referred to as the "plane of polarization") of incoming linearly polarized light by 90 degrees to the state of transmitting the incoming linearly polarized light as it is without rotating the plane of polarization thereof at all, or vice versa. The birefringent element 12 can shift the incoming light based on the direction of the plane of polarization of the incoming linearly polarized light.

In the example illustrated in FIG. 1, the direction of the electric vector (i.e., the polarization direction) of the light that is going to enter the liquid crystal cell 10 is parallel to the paper. The liquid crystal cell 10 uses a twisted nematic mode liquid crystal material (which will be herein referred to as a "TN mode liquid crystal material") with positive refractive index anisotropy $\Delta \epsilon$. Accordingly, while no voltage is being applied to the liquid crystal layer of the liquid crystal cell 10 (which state will be herein referred to as a "voltage-OFF state"), the liquid crystal molecules thereof are twisted by 90 degrees. Due to the optical rotatory property of the liquid crystal molecules, the plane of polarization of the incoming light rotates 90 degrees. On the other hand, while a voltage that is equal to or higher than a predetermined level is being applied to the liquid crystal layer of the liquid crystal cell 10 (which state will be herein referred to as a "voltage-ON state"), the major-axis direction of the liquid crystal molecules is aligned with the direction of the electric field generated. Accordingly, the incoming light goes out of the liquid crystal cell 10 without getting its plane of polarization rotated by the liquid crystal molecules. That is to say, the plane of polarization of the outgoing light is still parallel to the paper. Then, the birefringent element 12 directly transmits the light with the plane of polarization parallel to the paper, but refracts, or shifts, the light with the plane of polarization crossing the paper at right angles.

In the optical path shifter shown in FIG. 1, the liquid crystal cell 10 thereof needs to be switched appropriately and quickly from the state of passing, or transmitting, the first linearly polarized light into the state of letting go the second linearly polarized light, having a plane of polarization that crosses that of the first linearly polarized light at right angles, or vice versa, depending on the magnitude of the voltage applied thereto.

A projection type optical display system, including such an optical path shifter, is disclosed in Japanese Laid-Open Publication No. 4-63332.

The optical path shifter having the configuration shown in FIG. 1, however, has the following drawbacks.

To shift the image to a target location, the optical path shifter makes the liquid crystal cell 10 either rotate the plane of polarization of the incoming light 90 degrees or transmit it as it is without rotating the plane of polarization at all. Accordingly, the polarization state of the light that has been transmitted through this optical path shifter changes according to the specific location to which the pixel has been displaced. For example, referring to FIG. 1, to displace the pixel to the location A, the liquid crystal cell 10 should be in OFF state (or voltage-OFF state) and the light that has gone out of the birefringent element 12 should have a polarization direction coming out of the paper. On the other hand, to displace the pixel to the location B, the liquid crystal cell 10 should be in ON state (or voltage-ON state) and the light that has gone out of the birefringent element 12 should have a polarization direction parallel to the paper just like the incoming linearly polarized light.

Meanwhile, an optical display system such as an HMD or a projector, to which such an optical path shifter is applicable, normally uses various types of optical members (e.g., optical path refracting elements or lenses) as a portion of its viewing or projection optical system. In each of those optical members, the transmittance or reflectance thereof changes depending on the polarization state of the incoming light, which is also changeable with the state of the treated surface of the optical member or the angle of incidence of the incoming light. As described above, when the optical path shifter shown in FIG. 1 is used, the polarization direction of its outgoing light changes depending on the specific location to which the pixel has been displaced. Thus, when transmitted or reflected by the viewing or projection optical system, a light ray having one polarization direction corresponding to one shift location will have a different intensity from that of another light ray having the other polarization direction corresponding to another shift location. Such a variation in the intensity of the light is quite perceivable as an eyesore flicker, thus deteriorating the quality of the image displayed seriously.

For example, in a three-panel projector, including three LCD panels provided for the three primary colors of R, G and B, respectively, the optical path shifter shown in FIG. 1 is allocated to each of those three panels such that three image components representing the R, G and B can be optically shifted independently of each other. In that case, a color synthesizing prism needs to be used to synthesize the three light rays that have been transmitted through these three optical path shifters. The color synthesizing prism normally has a red reflecting plane and a blue reflecting plane, each of which is made of a dielectric film, as shown in FIG. 2. The transmittance (or reflectance) of the red or blue reflecting plane changes significantly according to the polarization direction of the incoming light (i.e., whether it is P polarized or S polarized) as shown in FIGS. 3A and 3B. In the blue reflecting plane, the S polarized light reflected should have a longer wavelength than the P polarized light reflected to achieve the same transmittance as can be seen from FIG. 3A. In the red reflecting plane on the other hand, the S polarized light reflected should have a shorter wavelength than the P polarized light reflected to achieve the same transmittance as can be seen from FIG. 3B. Accordingly, when S polarized R and B light rays and P polarized G light ray are incident in combination onto the color synthesizing prism, the available wavelength ranges can be expanded for all of the R, G and B light rays. As used herein, the "P polarized light ray" is a linearly polarized light ray that vibrates parallelly to the paper of FIG. 2 while the "S polarized light ray" is a linearly polarized light ray that vibrates vertically to the paper of FIG. 2.

Thus, to increase the optical efficiency, it is advantageous to make S polarized R and B light rays and P polarized G light ray incident onto the color synthesizing prism as disclosed in Japanese Patent Publication for Opposition No. 6-8985.

However, if the optical path shifter having the configuration shown in FIG. 1 is applied to a three-panel liquid crystal projector, then the polarization direction of an incoming light ray that is going to enter the color synthesizing prism changes according to the specific location to which the pixel has been shifted. Thus, every time the image is shifted, the brightness of the R, G or B light ray changes. As a result, not only the unwanted flickering phenomenon is created but also the color itself changes unintentionally, thus deteriorating the quality of the image displayed significantly.

SUMMARY OF THE INVENTION

In order to overcome the problems described above, a primary object of the present invention is to provide an optical device that hardly changes the polarization state of its outgoing light ray even if the optical path of its incoming light ray gets shifted by an optical path shifter.

Another object of the present invention is to provide an optical display system that can display an image of excellent quality by minimizing the unwanted flicker that is normally caused by image or pixel shifting.

An optical device according to a preferred embodiment of the present invention preferably includes an optical path shifter that has at least one optical path shifting section. The optical path shifting section preferably includes: a polarization modulator for changing the polarization state of an incoming light ray; and a birefringent element for shifting the optical path of an outgoing light ray of the polarization modulator based on the polarization state of the outgoing light ray. The optical device preferably further includes a polarization corrector, which selectively changes the polarization state of an outgoing light ray of the optical path shifter, thereby keeping the polarization state of an outgoing light ray of the polarization corrector substantially unchanged no matter where the optical path has been shifted.

In one preferred embodiment of the present invention, the polarization modulator preferably rotates the polarization direction of the incoming light ray in a selected period.

In another preferred embodiment of the present invention, an outgoing light ray of the polarization corrector is preferably a linearly polarized light ray at least in a predetermined wavelength range and preferably has a substantially constant polarization direction no matter where the optical path has been shifted.

In still another preferred embodiment, the optical device preferably further includes a polarization regulator that transmits only a particular linearly polarized light component having a selected polarization direction on receiving the outgoing light ray of the polarization corrector.

In yet another preferred embodiment, the polarization modulator preferably includes: a liquid crystal layer; and an electrode for applying a voltage to the liquid crystal layer.

In yet another preferred embodiment, the polarization corrector preferably includes: a liquid crystal layer; and an electrode for applying a voltage to the liquid crystal layer.

In yet another preferred embodiment, the response speed of the polarization corrector is preferably substantially equal to that of the polarization modulator.

In yet another preferred embodiment, the outgoing light ray of the polarization corrector is preferably a circularly polarized light ray.

In this particular preferred embodiment, the polarization corrector is preferably a phase plate.

An apparatus according to another preferred embodiment of the present invention preferably includes: the optical device according to any of the preferred embodiments of the present invention described above; and an optical member, which is disposed so as to receive the outgoing light ray of the polarization corrector of the optical device.

In one preferred embodiment of the present invention, the transmittance and/or reflectance of the optical member has polarization dependence.

In another preferred embodiment, the optical member preferably selectively transmits or reflects a light ray that falls within a particular wavelength range.

An optical display system according to still another preferred embodiment of the present invention preferably includes: a light source, which emits a light ray; a display panel, which modulates the light ray, emitted from the light source, in response to a signal; and an optical path shifter, which is disposed at such a position as to receive an outgoing light ray of the display panel and which optically displaces an image, which has been displayed on the display panel, on a frame-by-frame basis. The optical path shifter preferably includes at least one shifting section. The shifting section preferably includes: a polarization modulator for changing the polarization state of the outgoing light ray of the display panel; and a birefringent element for shifting the optical path of an outgoing light ray of the polarization modulator based on the polarization state of the outgoing light ray. The optical display system preferably further includes a polarization corrector, which selectively changes the polarization state of an outgoing light ray of the optical path shifter, thereby keeping the polarization state of an outgoing light ray of the polarization corrector substantially unchanged no matter where the optical path has been shifted.

In one preferred embodiment of the present invention, the polarization modulator preferably rotates the polarization direction of the outgoing light ray of the display panel in a selected period.

In another preferred embodiment, an outgoing light ray of the polarization corrector is preferably a linearly polarized light ray at least in a predetermined wavelength range and preferably has a substantially constant polarization direction no matter where the optical path has been shifted.

In still another preferred embodiment, the optical display system preferably further includes a polarization regulator that transmits only a particular linearly polarized light component having a selected polarization direction on receiving the outgoing light ray of the polarization corrector.

In yet another preferred embodiment, the polarization modulator preferably includes: a liquid crystal layer; and an electrode for applying a voltage to the liquid crystal layer.

In yet another preferred embodiment, the polarization corrector preferably includes: a liquid crystal layer; and an electrode for applying a voltage to the liquid crystal layer.

In yet another preferred embodiment, the response speed of the polarization corrector is preferably substantially equal to that of the polarization modulator.

In yet another preferred embodiment, the outgoing light ray of the polarization corrector is preferably a circularly polarized light ray.

In this particular preferred embodiment, the polarization corrector is preferably a phase plate.

In yet another preferred embodiment, the optical display system preferably further includes: a color separating optical system for splitting the light ray, emitted from the light source, into red, green and blue light rays; color synthesizing means for synthesizing the red, green and blue light rays together; and projecting means for projecting the synthesized light ray that has gone out of the color synthesizing means. The display panel, the optical path shifter and the polarization corrector are preferably disposed on the optical path of each of the red, green and blue light rays. The optical path shifters and the polarization correctors are preferably located between the display panels and the color synthesizing means.

In this particular preferred embodiment, an outgoing light ray of the polarization corrector for the green light ray is preferably a linearly polarized light ray that is substantially P polarized with respect to a color synthesizing plane of the color synthesizing means. Outgoing light rays of the two polarization correctors for the red and green light rays are preferably S polarized light rays, which have a polarization direction that defines an angle of approximately 90 degrees with that of the outgoing light ray of the polarization corrector for the green light ray.

Specifically, the optical display system preferably includes at least one polarization regulator that selectively transmits at least one of the outgoing light rays of the polarization correctors. The at least one light ray transmitted is preferably a particular linearly polarized light ray having a selected polarization direction.

More specifically, the polarization regulator is preferably disposed on the optical path of each of the red and blue light rays but preferably not disposed on the optical path of the green light ray.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Embodiment 1

Hereinafter, a specific preferred embodiment of an optical device according to the present invention will be described with reference to FIGS. 4A and 4B.

Figure 1:
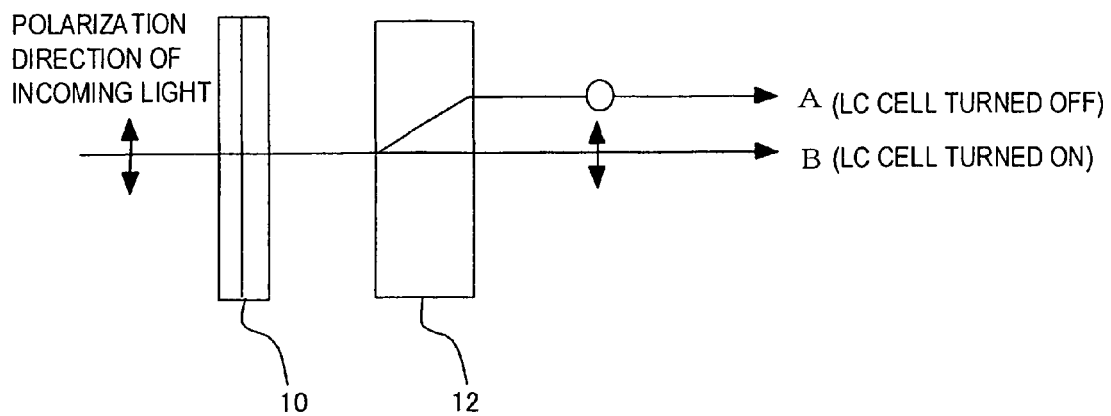
FIG. 1 illustrates an exemplary arrangement of a conventional optical path shifter consisting of a liquid crystal cell and a birefringent element.
Figure 2:
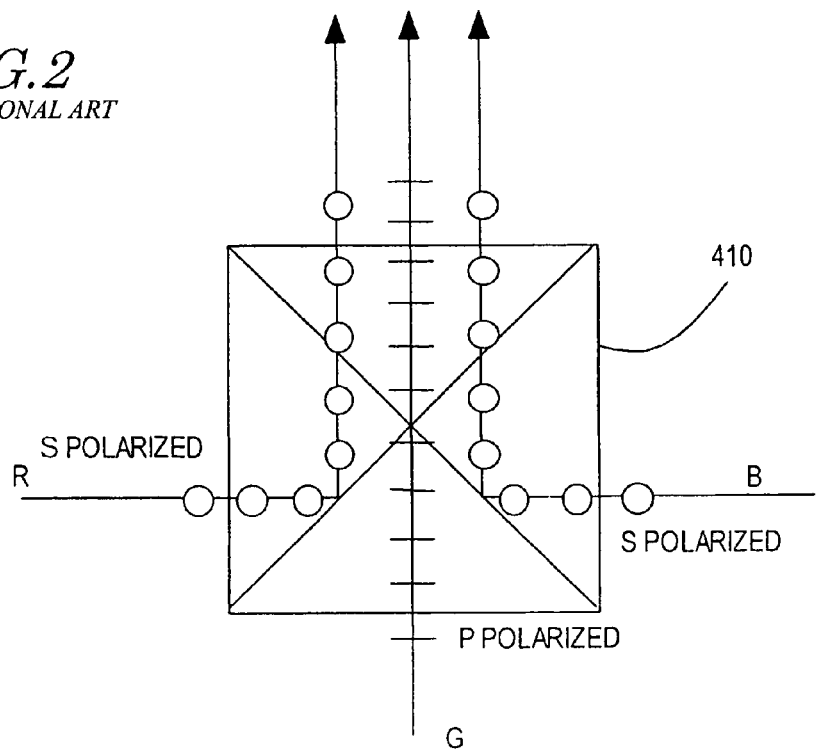
FIG. 2 illustrates how a color synthesizing prism works.
Figure 3A:
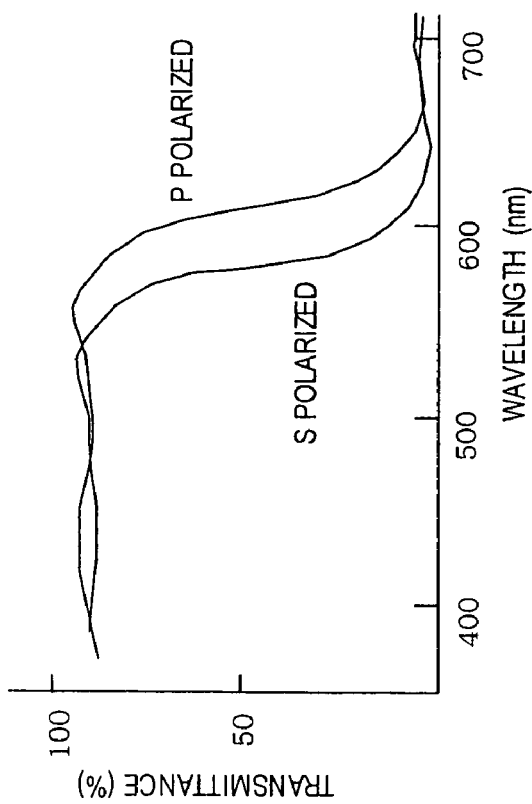
FIG. 3A is a graph showing how the transmittance of a blue reflecting plane of the color synthesizing prism shown in FIG. 2 changes with the wavelength of an incoming polarized light ray.
Figure 3B:
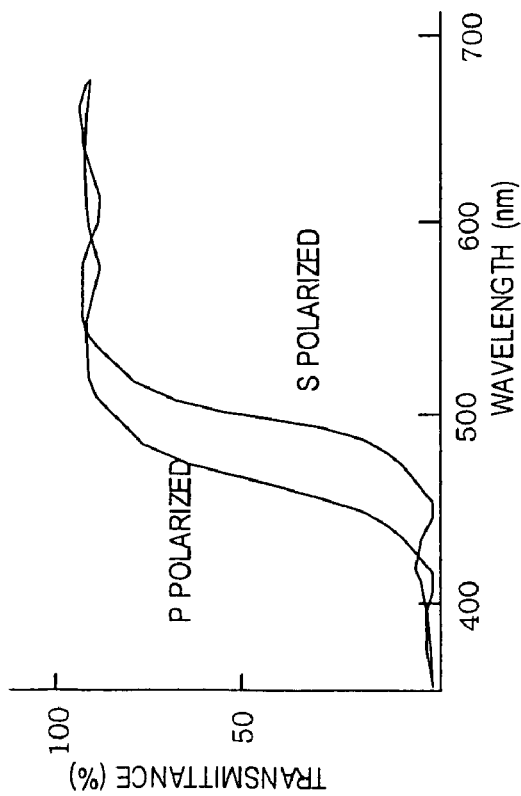
FIG. 3B is a graph showing how the transmittance of a red reflecting plane of the color synthesizing prism changes with the wavelength of the incoming polarized light ray.
Figure 4A:
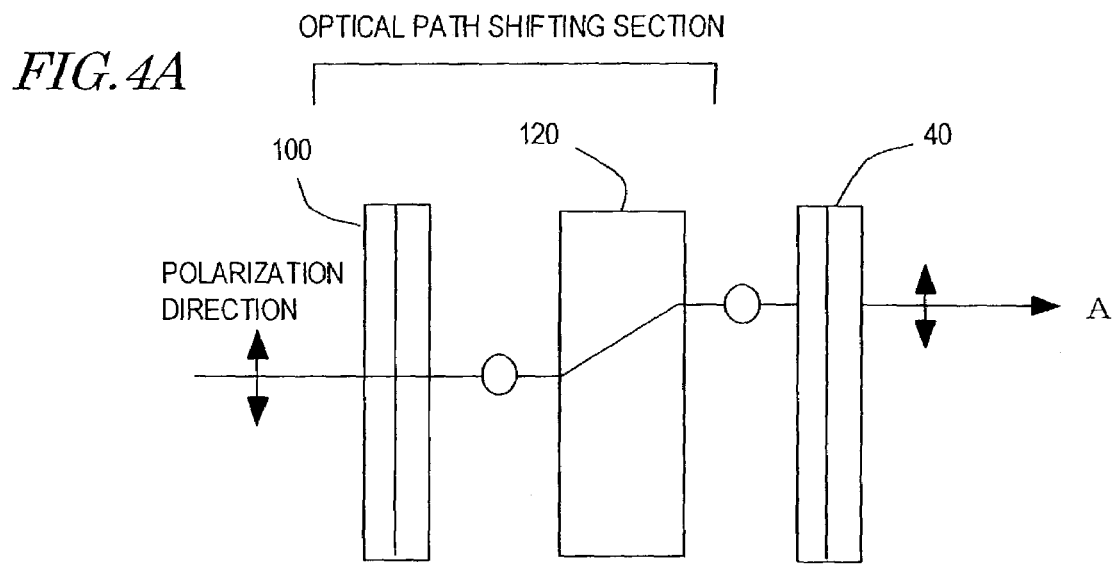
FIGS. 4A and 4B show how a polarization corrector operates.
Figure 4B:
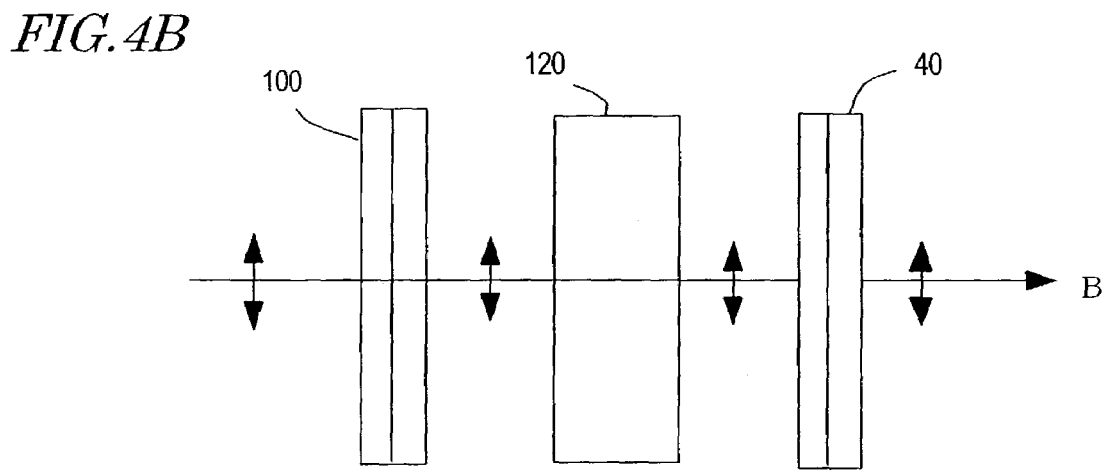

As shown in FIGS. 4A and 4B, the optical device includes an optical path shifter and a polarization corrector 40, and the optical path shifter includes at least one optical path shifting section. The optical path shifting section includes: a polarization modulator 100 for changing the polarization state of an incoming light ray; and a birefringent element 120 for shifting the optical path of an outgoing light ray of the polarization modulator 100 based on the polarization state of the outgoing light ray. In the following illustrative preferred embodiment, a linearly polarized light ray, having a polarization direction as indicated by the arrows shown in FIGS. 4A and 4B, is supposed to be incident onto the polarization modulator 100 from the left-hand side of the optical path shifter for the sake of simplicity. As used herein, the "linearly polarized light ray" does not have to be completely linearly polarized over the entire visible radiation range but has only to be substantially linearly polarized just in a predetermined wavelength range.

The polarization modulator 100 can rotate the polarization direction of an incoming light ray in an arbitrarily selected period and is preferably implemented as a liquid crystal cell. The liquid crystal cell typically includes a pair of transparent substrates, a liquid crystal layer sandwiched between the substrates, and a transparent electrode (or transparent conductive film) that applies a voltage to the liquid crystal layer. When the polarization modulator 100 is implemented as such a liquid crystal cell, the liquid crystal material thereof may be a TN mode liquid crystal material, for example, but may also be an ECB mode liquid crystal material or a ferroelectric liquid crystal material.

The birefringent element 120 is made of a uniaxial crystalline material (e.g., quartz). However, the material for the birefringent element 120 is not limited to quartz but may be any other uniaxial crystalline material. Examples of other preferred materials include lithium niobate, calcite, mica, rutile ($TiO_2$) and nitratine ($NaNO_3$). If the total weight of the display system should be reduced as in a head mounted display (HMD), lithium niobate or rutile having relatively large refractive index anisotropy $\Delta n$ is preferably used. When the birefringent element 120 is made of such a high $\Delta n$ material, the image or pixel can get shifted a required distance by the birefringent element 120 with a reduced thickness. Thus, such a material can be used effectively to reduce the overall size or weight of the display system.

The optical device of the present invention is characterized by including a polarization corrector 40 that selectively changes the polarization state of an outgoing light ray of the optical path shifter, thereby keeping the polarization state of an outgoing light ray of the polarization corrector 40 substantially unchanged no matter where the optical path has been shifted.

The polarization corrector 40 may be implemented as a liquid crystal cell of the same type as the polarization modulator 100. In that case, the plane of polarization of the outgoing light ray of the optical path shifter may be rotated by the liquid crystal cell as the polarization corrector 40 while the plane of polarization of the incoming light ray of the optical path shifter is rotated by the liquid crystal cell as the polarization modulator 100. That is to say, the incoming and outgoing light rays of the optical path shifter may have their planes of polarization rotated synchronously with each other. Then, the outgoing light ray of the polarization corrector 40 can always have the same polarization direction (or can always keep its plane of polarization non-rotated).

In the state illustrated in FIG. 4A, the plane of polarization of the incoming light ray is rotated 90 degrees by the polarization modulator 100 and then further rotated 90 degrees by the polarization corrector 40. As a result, the polarization direction of the light ray that is going to enter the polarization modulator 100 is the same as that of the light ray that has gone out of the polarization corrector 40. Meanwhile, in the state shown in FIG. 4B, the plane of polarization of the incoming light ray of the optical path shifter is not rotated by the polarization modulator 100 and that of its outgoing light ray is not rotated by the polarization corrector 40, either. Consequently, the polarization direction of the light ray that is going to enter the polarization modulator 100 is also the same as that of the light ray that has gone out of the polarization corrector 40.

A smooth transition between the states shown in FIGS. 4A and 4B is realized by switching the polarization modulator 100 and the polarization corrector 40 synchronously with each other. Thus, if the polarization modulator 100 and the polarization corrector 40 are operated precisely with the optical path shifting timing, the outgoing light ray of the polarization corrector 40 can always keep its polarization state substantially unchanged and can always have substantially the same polarization direction.

However, if a time lag was caused between the switching timing of the polarization modulator 100 and that of the polarization corrector 40 or if there was a non-negligible difference between the switching rates of these elements 100 and 40, then the polarization direction of the outgoing light ray might be temporarily deviated from the desired one. To minimize such unwanted deviation, the polarization modulator 100 and polarization corrector 40 are preferably implemented as a pair of elements having substantially the same structure so that the switching rates of the polarization modulator 100 and polarization corrector 40 are equalized with each other. Thus, if the polarization modulator 100 is implemented as a liquid crystal cell of a TN mode liquid crystal material, for example, then the polarization corrector 40 is also preferably implemented as a liquid crystal cell of the same TN mode liquid crystal material.

In the preferred embodiment described above, the polarization corrector 40 is supposed to be an element that can selectively rotate the plane of polarization of the incoming linearly polarized light ray by 90 degrees synchronously with the optical path shifting timing. However, the polarization corrector 40 is not limited to such a type of element. For example, a quarter wave phase plate may also be used as the polarization corrector 40. In that case, if a linearly polarized light ray has entered the polarization corrector 40, a circularly polarized light ray always goes out of the polarization corrector 40 no matter where the optical path of the linearly polarized light ray has been shifted. Then, even if an optical member having some polarization dependence is disposed behind the polarization corrector 40, the flicker and other unwanted phenomena could be minimized.

In the preferred embodiment illustrated in FIGS. 4A and 4B, the outgoing light ray of the polarization corrector 40 always has the same polarization direction, i.e., parallel to the paper of FIGS. 4A and 4B, no matter where the optical path of its incoming light ray has been shifted. However, the present invention is in no way limited to this specific preferred embodiment. Alternatively, even if the light ray that is going to enter the liquid crystal cell 100 has a polarization direction that is parallel to the paper of FIGS. 4A and 4B, the light ray that has gone out of the polarization corrector 40 may always have a polarization direction coming out of the paper of FIGS. 4A and 4B no matter where the optical path of its incoming light ray has been shifted.

Furthermore, it is also possible to switch the polarization direction of the outgoing light ray of the polarization corrector 40 from parallelly to perpendicularly to the paper of FIGS. 4A and 4B, or vice versa, on a mode-by-mode basis.

Embodiment 2

Hereinafter, a specific preferred embodiment of an optical display system according to the present invention will be described with reference to FIGS. 5 and 6.

Figure 5:
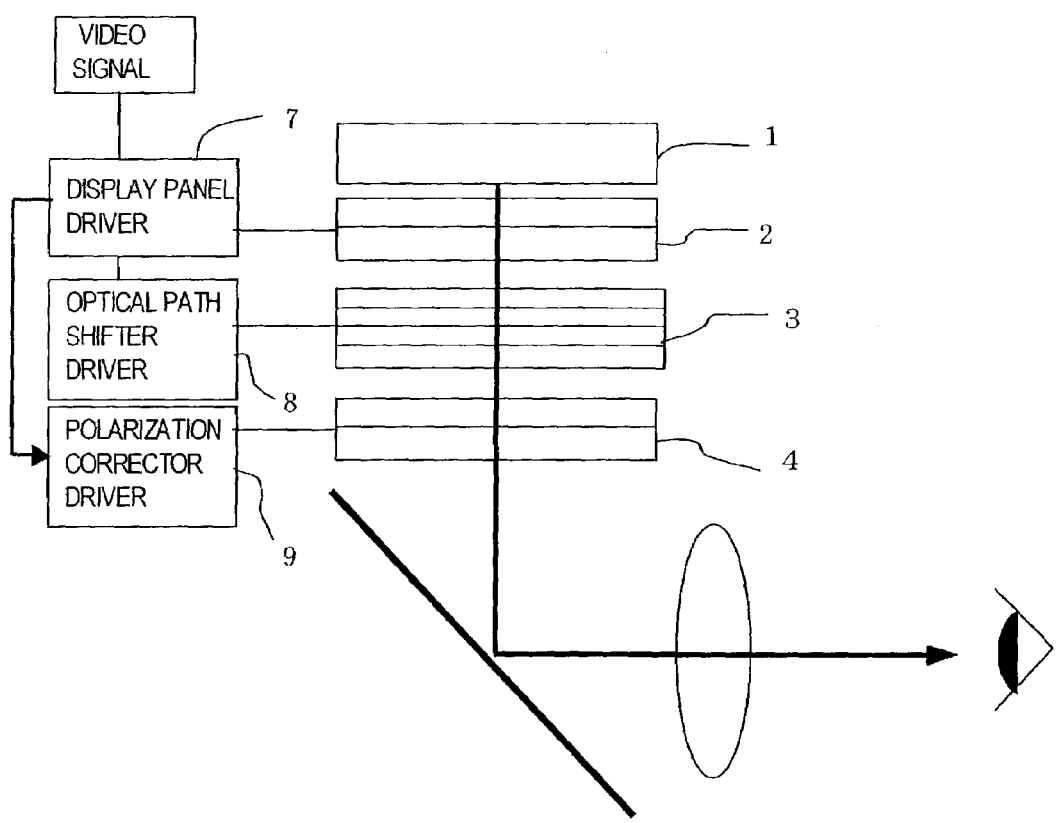
FIG. 5 is a schematic representation illustrating an optical display system according to a first specific preferred embodiment of the present invention.

As shown in FIG. 5, the optical display system includes a backlight 1, an LCD panel 2, an optical path shifter 3, a polarization corrector 4, a reflective mirror 5 and a viewing optical system 6. The backlight 1 is a light source to illuminate the LCD panel 2 of a transmission type. The LCD panel 2 may be a known LCD panel, which receives a drive signal, a video signal and other signals from its associated driver circuit 7 and can display an image of which the contents are represented by the video signal. As used herein, the "image" broadly refers to any two-dimensional arrangement of information. Thus, the "images" to be displayed on the LCD panel 2 include not just images in a narrow sense but also various other types of information such as texts and characters.

Although not shown in FIG. 5, a pair of crossed Nicol polarizers is disposed in front of and behind the LCD panel 2 to regulate the polarization states of the incoming and outgoing light rays of the LCD panel 2.

The viewing optical system 6 is provided as an optical system to optically magnify the image that has been displayed on the LCD panel 2. The viewer can view the image that has been displayed on the LCD panel 2 by way of the optical path shifter 3, polarization corrector 4, reflective mirror 5, and viewing optical system 6.

In the specific preferred embodiment shown in FIG. 5, a transmissive LCD panel that needs the backlight 1 is used as the display panel. Alternatively, as long as an image can be displayed thereon, the display panel may also be a reflective LCD panel or a self-emitting display panel such as an organic EL display or a plasma display panel (PDP).

The operation of the optical path shifter 3 is controlled by another driver circuit 8, which is separately provided for the optical path shifter 3. Synchronously with the display of a video signal on the LCD panel 2, the driver circuit 8 supplies a drive signal to the optical path shifter 3. The driver circuit 8 includes a voltage applying section for applying voltages having multiple levels (i.e., high and low) to a plurality of liquid crystal cells included in the optical path shifter 3.

The operation of the polarization corrector 4 is controlled by yet another driver circuit 9, which is separately provided for the polarization corrector 4. Synchronously with the display of a video signal on the LCD panel 2, the driver circuit 9 supplies a drive signal to the polarization corrector 4. The driver circuit 9 includes a voltage applying section for applying voltages having multiple levels (i.e., high and low) to the liquid crystal cell used as the polarization corrector 4.

In the optical display system shown in FIG. 5, each of the backlight 1, LCD panel 2, reflective mirror 5, viewing optical system 6 and driver circuits 7, 8 and 9 may have the same configuration as the counterpart of the conventional optical display system. Thus, the optical display system of this preferred embodiment is characterized by the configurations and operations of the optical path shifter 3 and polarization corrector 4.

Figure 6:
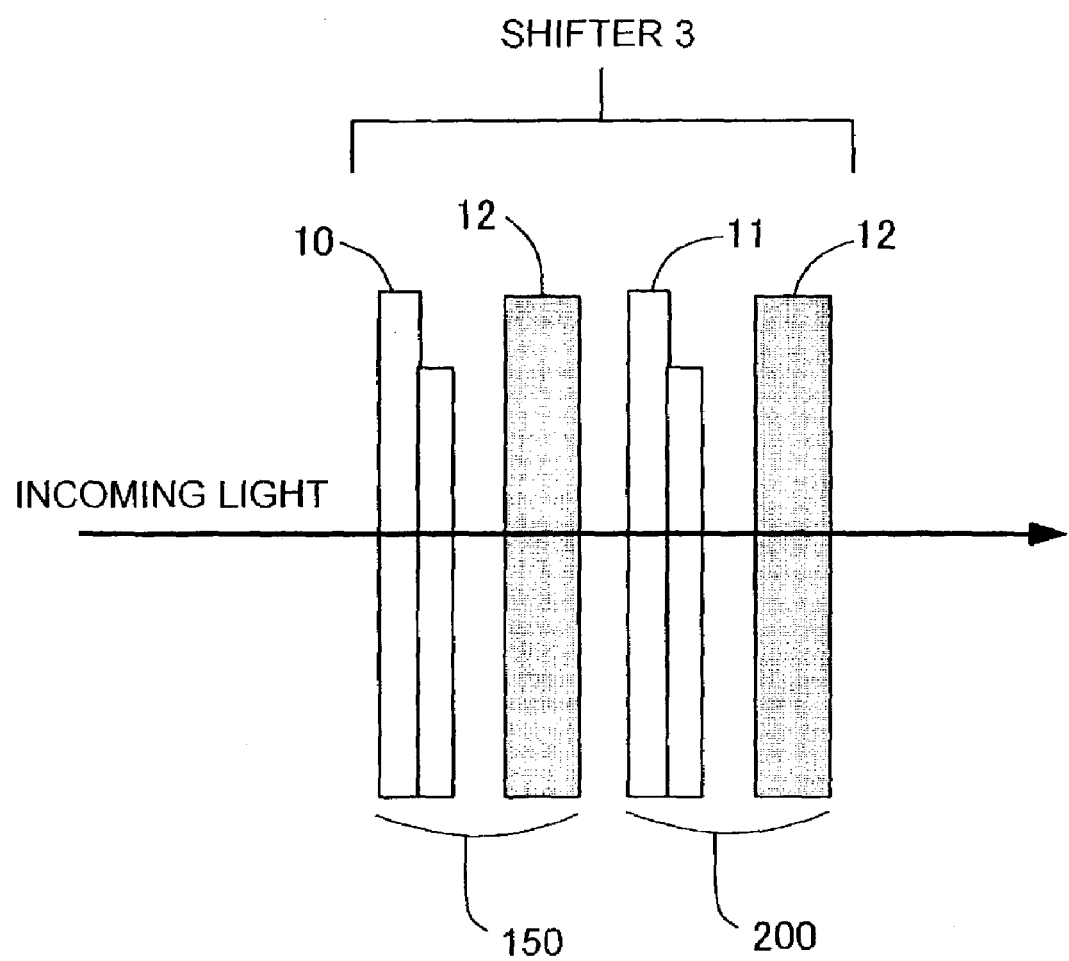
FIG. 6 illustrates an exemplary arrangement of an optical path shifter for use in the first preferred embodiment.

FIG. 6 illustrates an exemplary arrangement of the optical path shifter 3 according to this preferred embodiment. As shown in FIG. 6, the optical path shifter 3 includes two optical path shifting sections, i.e., a first shifting section 150 for shifting the image vertically and a second shifting section 200 for shifting the image horizontally.

The first shifting section 150 includes a liquid crystal cell 10 and a birefringent element 12. Likewise, the second shifting section 200 also includes a liquid crystal cell 11 and a birefringent element 12. Each of the liquid crystal cells 10 and 11 includes: a liquid crystal layer; a pair of transparent electrodes (not shown) provided on the light incoming and outgoing sides of the liquid crystal layer, respectively; and a pair of transparent substrates that sandwiches these members between them. The liquid crystal cell 10 and the birefringent element 12 may be bonded together with an adhesive, for example, so that the first shifting section 150 works as one integral component. The same statement is applicable to the second shifting section 200. Optionally, the first and second shifting sections 150 and 200 may also be bonded together.

In this preferred embodiment, the liquid crystal layer of the liquid crystal cells 10 and 11 is made of a TN mode liquid crystal material. Thus, each of the liquid crystal cells 10 and 11 switches from a first state of rotating the plane of polarization of the incoming light ray 90 degrees into a second state of transmitting the incoming light ray as it is substantially without rotating the plane of polarization thereof, or vice versa, depending on whether the voltage applied thereto is high or low. However, the liquid crystal material that can be used for the liquid crystal cells 10 and 11 is not limited to the TN mode liquid crystal material. Alternatively, any other type of liquid crystal material such as an ECB mode liquid crystal material or a ferroelectric liquid crystal material may be also used.

The birefringent element 12 has an "optic axis" that defines a predetermined tilt angle with respect to the light incoming plane thereof. In a plane including the propagation direction of the incoming light ray and the optic axis of the birefringent element 12 (which will be herein referred to as a "principal section"), the birefringent element 12 can separate the incoming light ray into an ordinary ray and an extraordinary ray. Accordingly, if the polarization direction of the incoming light ray that is going to enter the birefringent element 12 is perpendicular to the principal section, then the incoming light ray is an ordinary ray for the birefringent element 12 and is propagated straight through the principal section. On the other hand, if the polarization direction of the incoming light ray that is going to enter the birefringent element 12 is parallel to the principal section, then the incoming light ray is an extraordinary ray for the birefringent element 12 and is refracted within the principal section.

If the voltage applied to each of the liquid crystal cells 10 and 11 is changed, the polarization direction of the light ray that is going to enter the birefringent element 12 can be switched from perpendicular into parallel, or vice versa, to the principal section of the birefringent element 12. In this manner, the incoming light ray can be shifted within the principal section of the birefringent element 12. As a result, the image that has been displayed on the LCD panel 2 can be shifted perpendicularly to the optical axis of the incoming light ray.

The only difference between the first and second shifting sections 150 and 200 is that the second shifting section 200 is disposed so as to define an angle of 90 degrees on the optical axis of the incoming light ray with respect to the first shifting section 150. Accordingly, the pixel shifting direction of the second shifting section 200 is perpendicular to that of the first shifting section 150. By using the first and second shifting sections 150 and 200 that are disposed at such positions, the image can be selectively shifted to one of four different locations on the same (virtual) plane.

Hereinafter, it will be described with reference to FIGS. 7A through 7D how the optical path shifter of this preferred embodiment operates. In the following illustrative example, a liquid crystal cell having the same configuration as the liquid crystal cell 10 is used as the polarization corrector 4.

Figure 7:
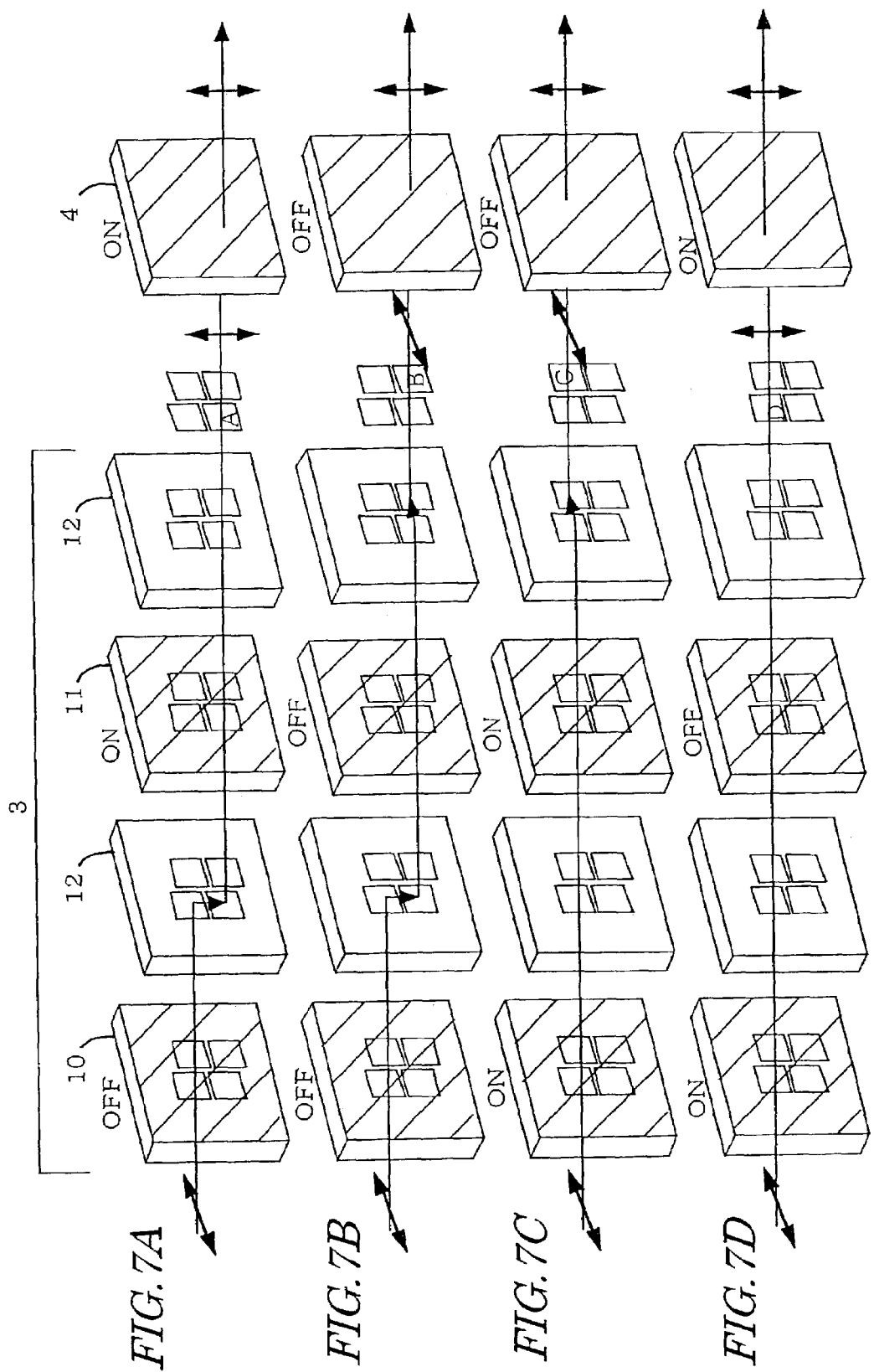
FIGS. 7A through 7D are perspective views showing how an optical path shifter and a polarization corrector operate in a second specific preferred embodiment of the present invention.

First, as shown in FIG. 7A, the liquid crystal cell 10 is turned OFF but the liquid crystal cell 11 is turned ON. At this point in time, an arbitrary pixel as a component of the image on the LCD panel 2 is supposed to be present at location A on the virtual plane. Since the incoming light ray of the optical path shifter 3 has its polarization direction rotated 90 degrees by the liquid crystal cell 10, the outgoing light ray of the optical path shifter 3 has a polarization direction that defines an angle of 90 degrees with that of the incoming light ray. In this case, the liquid crystal cell provided as the polarization corrector 4 is turned ON, thereby passing the incoming light ray of the polarization corrector 4 as it is without changing the polarization state thereof.

Next, as shown in FIG. 7B, the liquid crystal cell 10 is kept OFF and the liquid crystal cell 11 is turned OFF, thereby shifting the pixel to location B. Since the liquid crystal cells 10 and 11 are both in OFF state, the polarized light ray that has gone out of the optical path shifter 3 has the same polarization state as the polarized light ray that was going to enter the optical path shifter 3. In this case, if the liquid crystal cell provided as the polarization corrector 4 is turned OFF, the plane of polarization of the outgoing light ray of the optical path shifter is rotated 90 degrees by the polarization corrector 4. Accordingly, even though the pixel has been shifted to location B, the outgoing light ray of the polarization corrector 4 still has the same polarization direction as when the pixel was present at location A.

Next, as shown in FIG. 7C, the liquid crystal cells 10 and 11 are both turned ON, thereby shifting the pixel to location C. When the pixel is present at location C, the liquid crystal cells 10 and 11 are both ON. Accordingly, as in the pixel location B, the light ray that has gone out of the optical path shifter 3 has the same polarization state as the light ray that was going to enter the optical path shifter 3. In this case, if the liquid crystal cell provided as the polarization corrector 4 is turned OFF, the plane of polarization of the outgoing light ray of the optical path shifter is rotated 90 degrees by the polarization corrector 4. Accordingly, even though the pixel has been shifted to location C, the outgoing light ray of the polarization corrector 4 still has the same polarization direction as when the pixel was present at location A.

Next, as shown in FIG. 7D, the liquid crystal cell 10 is kept ON and the liquid crystal cell 11 is turned OFF, thereby shifting the pixel to location D. When the pixel is present at location D, the liquid crystal cell 10 is ON and the liquid crystal cell 11 is OFF. Since the incoming light ray of the optical path shifter 3 has its polarization direction rotated 90 degrees by the liquid crystal cell 11, the outgoing light ray of the optical path shifter 3 has a polarization direction that defines an angle of 90 degrees with that of the incoming light ray. In this case, the liquid crystal cell provided as the polarization corrector 4 is turned ON, thereby passing the incoming light ray of the polarization corrector 4 as it is without changing the polarization state thereof. Accordingly, even though the pixel has been shifted to location D, the outgoing light ray of the polarization corrector 4 still has the same polarization direction as when the pixel was present at location A.

Thereafter, when the liquid crystal cell 10 is turned OFF and the liquid crystal cell 11 is turned ON, the optical path shifter 3 returns to the state shown in FIG. 7A.

As described above, no matter which of the four locations A, B, C and D the pixel is present, the light ray that has gone out of the polarization corrector 4 always has the same polarization state, and then enters the reflective mirror 5 that is disposed behind the polarization corrector 4 to refract the optical path. The reflective mirror 5 and the viewing optical system 6 have some polarization dependence. That is to say, the reflective mirror 5 and viewing optical system 6 exhibit different reflection and transmission characteristics depending on the polarization direction of the incoming light ray. However, since the incoming light ray always has the same polarization state in this preferred embodiment, an image of quality can be obtained without being affected by the polarization dependence at all.

The optical display system of the preferred embodiment described above includes the viewing optical system 6 as in an HMD. However, as various optical members for use in a projector also have some polarization dependence, the present invention is also effectively applicable for use in a projector.

Embodiment 3

Figure 8:
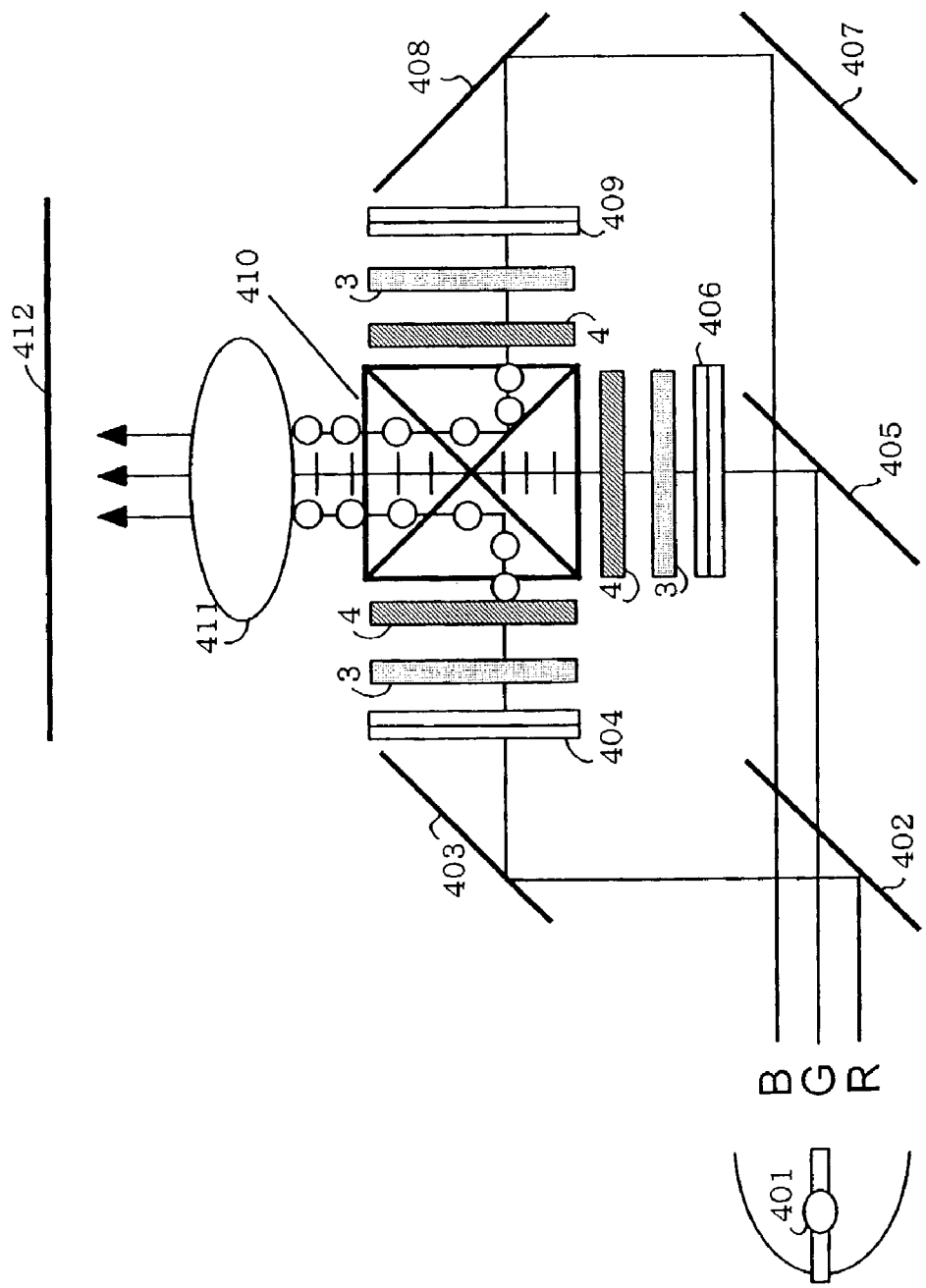
FIG. 8 is a schematic representation illustrating another specific preferred embodiment of an optical display system according to the present invention.

Hereinafter, another specific preferred embodiment of an optical display system according to the present invention will be described with reference to FIG. 8.

In this preferred embodiment, a UHP lamp having an illuminance of 120 W and an arc length of 1.4 mm and produced by Philips Corp. is used as a light source 401. Examples of other preferred light sources include halogen lamps, xenon lamps and metal halide lamps.

light emitted from the light source 401 includes red, green and blue light rays. The red light ray is reflected by a red-light-reflecting dichroic mirror 402, reflected again by a reflective mirror 403 and then incident onto a red LCD panel 404. On the other hand, the green and blue light rays are transmitted through the red-light-reflecting dichroic mirror 402 and then incident onto a green-light-reflecting dichroic mirror 405. The green light ray is reflected by the green-light-reflecting dichroic mirror 405 and then incident onto a green LCD panel 406. The blue light ray is transmitted through the green-light-reflecting dichroic mirror 405, reflected by two reflective mirrors 407 and 408 and then incident onto a blue LCD panel 409.

Behind each of the three LCD panels 404, 406 and 409, an optical path shifter 3 and a polarization corrector 4 are disposed. Each of the optical path shifter 3 and the polarization corrector 4 may have the same configuration as the counterpart of the first preferred embodiment described above.

The red, green and blue light rays are modulated by the LCD panels 404, 406 and 409, respectively, and then incident into the optical path shifter 3 and the polarization corrector 4. Each of these LCD panels 404, 406 and 409 is sandwiched between a pair of crossed Nicol polarizers (not shown) to regulate the polarization states of the incoming and outgoing light rays thereof.

Thereafter, the three light rays, which have gone out of the polarization correctors 4 for the LCD panels 404, 406 and 409, enter a color synthesizing prism 410. The red, green and blue light rays are synthesized together by the color synthesizing prism 410. Consequently, the synthesized light is projected onto a screen 412 by way of a projection lens 411.

Next, it will be described with reference to FIGS. 9A through 9D how the optical path shifter 3 and the polarization corrector 4 operate. In the following illustrative example, the optical path of the green light ray will be described. It should be noted, however, that the same statement is applicable to the red and blue light rays.

In this preferred embodiment, the pixel is sequentially shifted by the optical path shifter 3 to four different locations A, B, C and D, thereby increasing the apparent number of pixels fourfold.

Figures 9A, 9B, 9C, 9D:
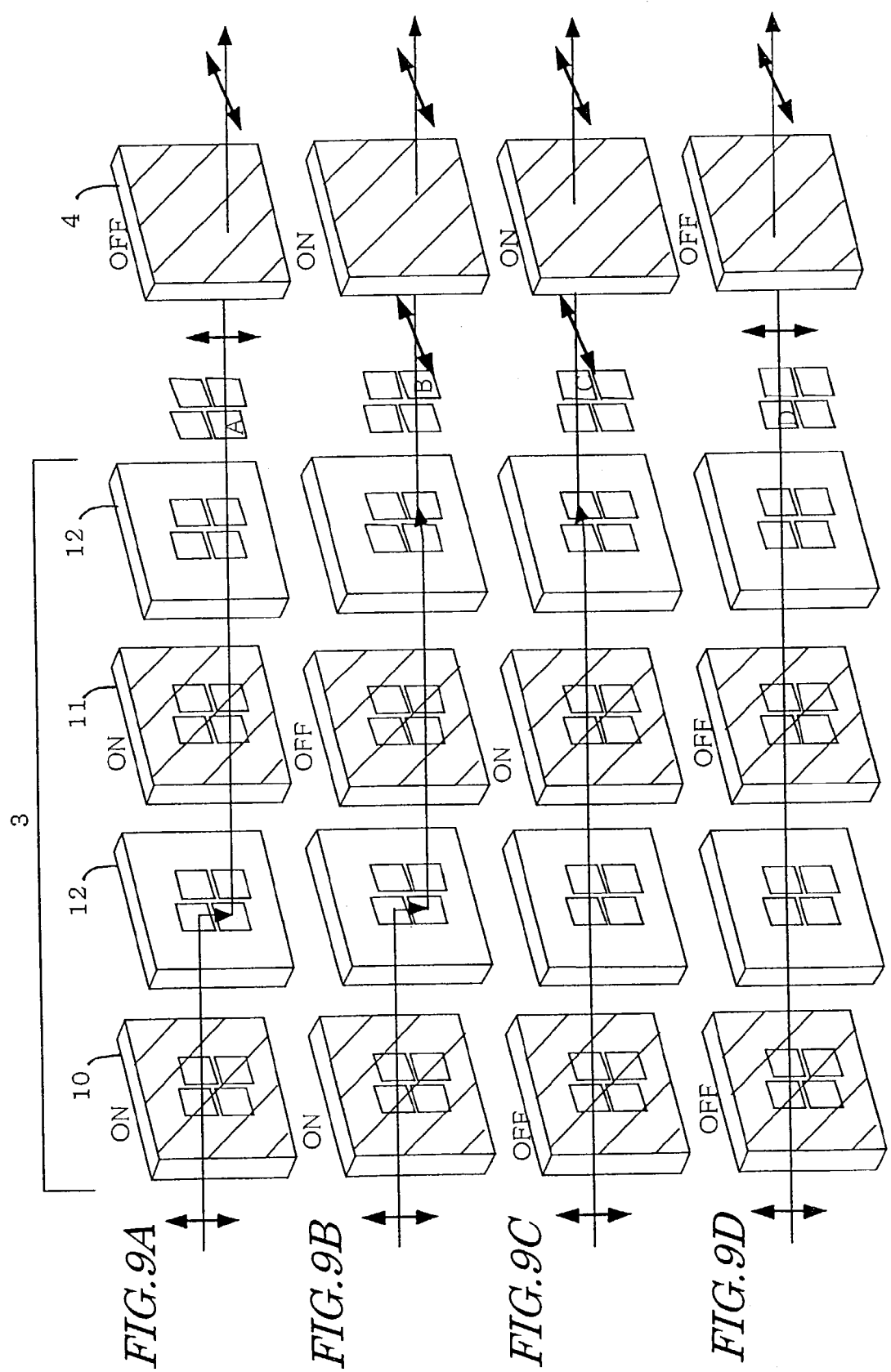
FIGS. 9A through 9D are perspective views showing how an optical shifter and a polarization corrector operate in a third specific preferred embodiment of the present invention.

First, as shown in FIG. 9A, the liquid crystal cells 10 and 11 are both ON when the pixel is present at location A. Thus, the polarization direction of the incoming light ray is not rotated by any of the liquid crystal cells 10 and 11. Accordingly, the light ray that has gone out of the optical path shifter 3 has the same polarization state as the light ray that was going to enter the optical path shifter 3. In this case, the liquid crystal cell provided as the polarization corrector 4 is turned OFF, thereby getting the plane of polarization of the incoming light ray rotated 90 degrees by the polarization corrector 4. As a result, the green light ray is incident as a P polarized light ray onto the color synthesizing prism 410.

Next, as shown in FIG. 9B, the liquid crystal cell 10 is kept ON but the liquid crystal cell 11 is turned OFF when the pixel is shifted to location B. Since the incoming light ray of the optical path shifter 3 has its polarization direction rotated 90 degrees by the liquid crystal cell 11, the outgoing light ray of the optical path shifter 3 has a polarization direction that defines an angle of 90 degrees with that of the incoming light ray. In this case, if the liquid crystal cell provided as the polarization corrector 4 is turned ON, the light ray that has been incident on the polarization corrector 4 is transmitted as it is without changing the polarization state thereof. Accordingly, even though the pixel has been shifted to location B, the outgoing light ray of the polarization corrector 4 still has the same polarization direction as when the pixel was present at location A.

Next, as shown in FIG. 9C, the liquid crystal cell 10 is turned OFF but the liquid crystal cell 11 is turned ON when the pixel is present at location C. Since the incoming light ray of the optical path shifter 3 has its polarization direction rotated 90 degrees by the liquid crystal cell 10, the outgoing light ray of the optical path shifter 3 has a polarization direction that defines an angle of 90 degrees with that of the incoming light ray. In this case, if the liquid crystal cell provided as the polarization corrector 4 is turned ON, the light ray that has been incident on the polarization corrector 4 is transmitted as it is without changing the polarization state thereof. Accordingly, even though the pixel has been shifted to location C, the outgoing light ray of the polarization corrector 4 still has the same polarization direction as when the pixel was present at location A.

Next, as shown in FIG. 9D, the liquid crystal cell 10 is kept OFF and the liquid crystal cell 11 is turned OFF when the pixel is present at location D. Since the liquid crystal cells 10 and 11 are both in OFF state, the light ray that has gone out of the optical path shifter 3 has the same polarization state as the light ray that was going to enter the optical path shifter 3. In this case, the liquid crystal cell provided as the polarization corrector 4 is turned OFF, thereby getting the plane of polarization of the incoming light ray rotated 90 degrees by the polarization corrector 4. Accordingly, even though the pixel has been shifted to location D, the outgoing light ray of the polarization corrector 4 still has the same polarization direction as when the pixel was present at location A.

As described above, no matter which of the four locations A, B, C and D the pixel has been shifted to, the outgoing light ray of the polarization corrector 4 always has the same polarization state and is always incident as a P polarized light ray onto the color reflecting (or transmitting) plane of the color synthesizing prism 410 that is disposed behind the polarization corrector 4.

The foregoing statement about the green light ray is also applicable to the red and blue light rays. As for the red and blue light rays, however, the polarization correctors 4 should operate to output them as linearly polarized light rays having a polarization direction that defines an angle of 90 degrees with that of the green light ray (i.e., S polarized light rays).

By adopting the arrangement described above, three polarized light rays, each of which always vibrates in the same direction, can be incident onto the color synthesizing prism 410. Consequently, a bright image of quality can be obtained.

In this preferred embodiment, red, green and blue light rays having particular polarization directions are made to be incident onto the color synthesizing prism 410, thereby preventing the flicker and other unwanted phenomena. However, the light ray to be incident onto the color synthesizing prism 410 does not always have to have the same polarization direction, but may have its polarization direction changed according to the mode of operation of the optical display system. For example, the polarization corrector according to the present invention may be used to switch the modes of operation of the optical display system between a data display mode and an audiovisual (AV) display mode. More specifically, high display brightness is required in the data display mode. Meanwhile, the AV display mode needs not so much brightness as excellent white balance. For that reason, it is sometimes preferable to decrease the intensity of the green light ray in the AV display mode. In that case, in the data display mode, the polarization correctors 4 are preferably operated just as described above, i.e., such that the S polarized red light ray, P polarized green light ray and S polarized blue light ray are incident onto the color synthesizing prism 410. In the AV display mode on the other hand, the polarization correctors 4 are preferably operated such that S polarized red, green and blue light rays are incident onto the color synthesizing prism 410. This is because if the S polarized green light ray is incident onto the color synthesizing prism 410, then the transmittance of the green light ray decreases slightly, the brightness also decreases a little but the white balance increases. As a result, the display quality of the color white improves.

In the preferred embodiments described above, liquid crystal cells having no screen division are used as the shifters and polarization correctors. However, the present invention is in no way limited to these specific preferred embodiments. For example, if the images displayed on the LCD panels 2, 404, 406 and 409 are switched by a progressive (or line sequential) scanning technique, then the images may be shifted synchronously with the switching of the images displayed. In that case, the liquid crystal cells included in the optical path shifter and polarization corrector do not modulate all light rays at a time over the entire screen but on a scan line basis or a block-by-block basis synchronously with the scanning process of the display panel. More specifically, the transparent electrode film of the liquid crystal cells used is divided into multiple regions so that the corresponding portions of the liquid crystal layer are driven independently. Then, the optical path shifter and the polarization corrector also need to be driven by their respective driver circuits synchronously with the switching of the images displayed.

In the second and third preferred embodiments described above, the image (or pixel) is shifted to four different locations. Alternatively, according to the present invention, the image may also be selectively shifted to two or three locations or even four or more locations that are arranged in line. That is to say, the present invention is compatible with any shifting pattern.

Furthermore, in the preferred embodiments described above, the liquid crystal cells are supposed to be switched within one frame period of the image to be displayed. However, the timing of switching the ON/OFF states of the voltages to be applied to the liquid crystal cells may be shifted adequately to the previous or following frame period such that well balanced switching is realized within the associated frame period based on the response speed of the liquid crystal material used.

Embodiment 4

Figure 10:
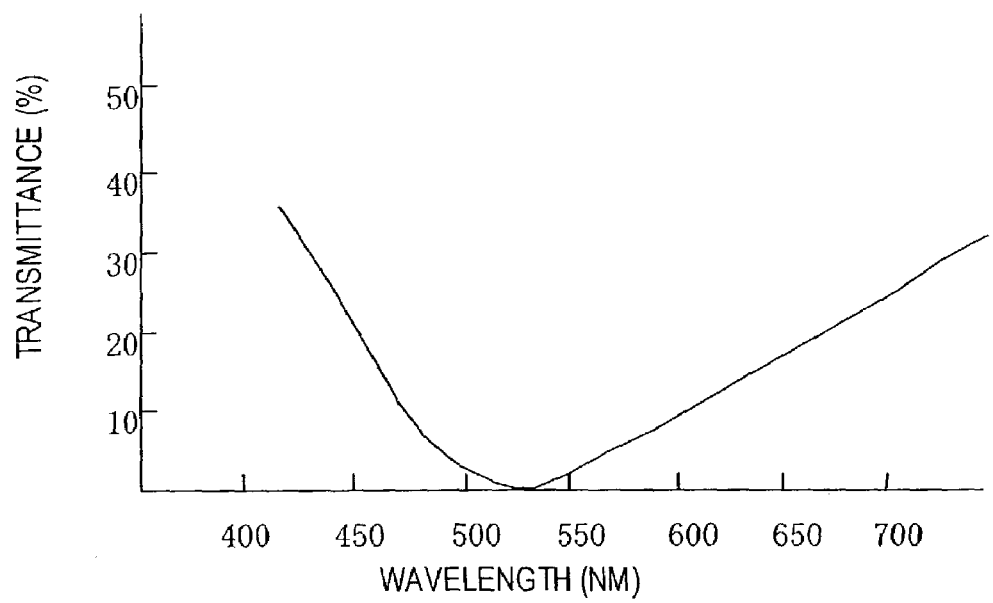
FIG. 10 is a graph showing how the transmittance of an outgoing light ray of a polarization modulator 100, which includes a TN mode liquid crystal cell and a pair of parallel Nicol polarizers disposed in front of and behind the liquid crystal cell, changes with the wavelength of an incoming light ray thereof.

FIG. 10 is a graph showing how the transmittance of an outgoing light ray of a polarization modulator 100, which includes a TN mode liquid crystal cell and a pair of parallel Nicol polarizers disposed in front of and behind the liquid crystal cell, changes with the wavelength of an incoming light ray thereof.

It can be seen that the polarization modulator 100 having the wavelength dependence shown in FIG. 10 changes an incoming light ray having a wavelength falling within the range of about 500 nm to about 550 nm into a linearly polarized light ray with a polarization direction that defines an angle of 90 degrees with that of the incoming light ray. On the other hand, an incoming light ray having a wavelength that falls out of the 500–550 nm range is output as an elliptically polarized light ray. Thus, the outgoing light ray of the polarization modulator 100 is not always a linearly polarized light ray.

Where the polarization modulator 100 is made of a liquid crystal material, the polarization conversion characteristic thereof normally has such wavelength dependence. It depends on the specific design process in what wavelength range the polarization direction should be rotated 90 degrees. Generally speaking, though, a wavelength range corresponding to the color green is preferably selected because that wavelength range is falls between two other wavelength ranges corresponding to the colors red and blue.

Figure 11:
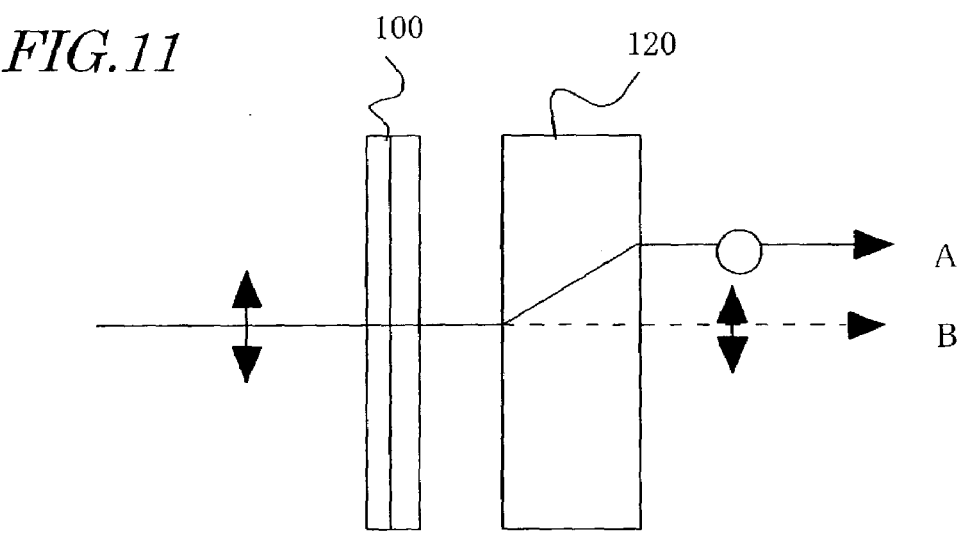
FIG. 11 shows how a ghost image is produced by elliptically polarized components.

If an optical path shifter includes a polarization modulator 100 having such wavelength dependence, then most of the incoming light ray having a wavelength falling within the 500–550 nm range is changed into an almost completely linearly polarized light ray, which eventually reaches the location A shown in FIG. 11. However, some components of the light ray, falling within other wavelength ranges, are elliptically polarized, and are directed toward the location B shown in FIG. 11. As a result, a ghost image is produced.

Next, it will be described in further detail with reference to FIGS. 12A and 12B why the ghost image is produced.

Figure 12A:
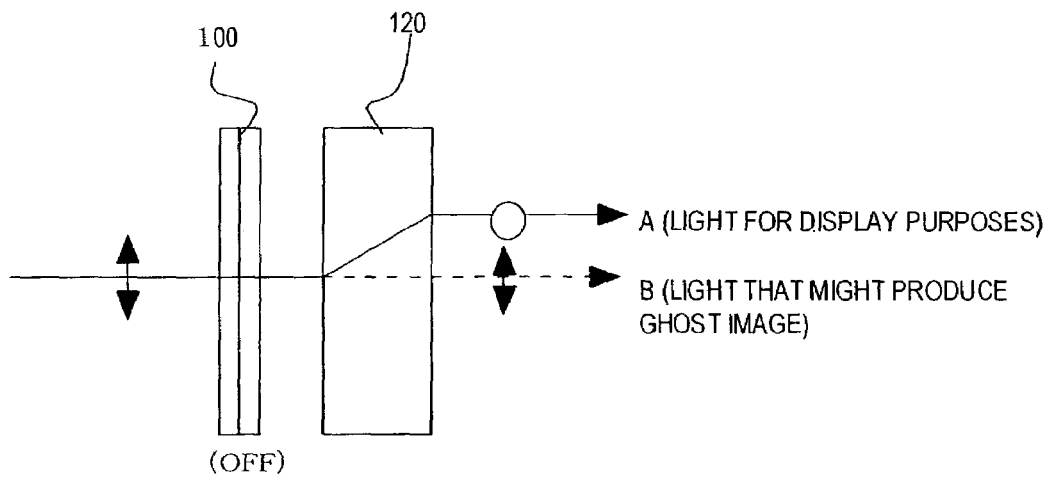
FIGS. 12A and 12B show how an optical path shifter including no polarization regulator shifts the optical path of an incoming light ray while no voltage is being applied to the liquid crystal layer of the polarization modulator 100 and while a voltage is being applied to the liquid crystal layer of the polarization modulator 100, respectively.
Figure 12B:
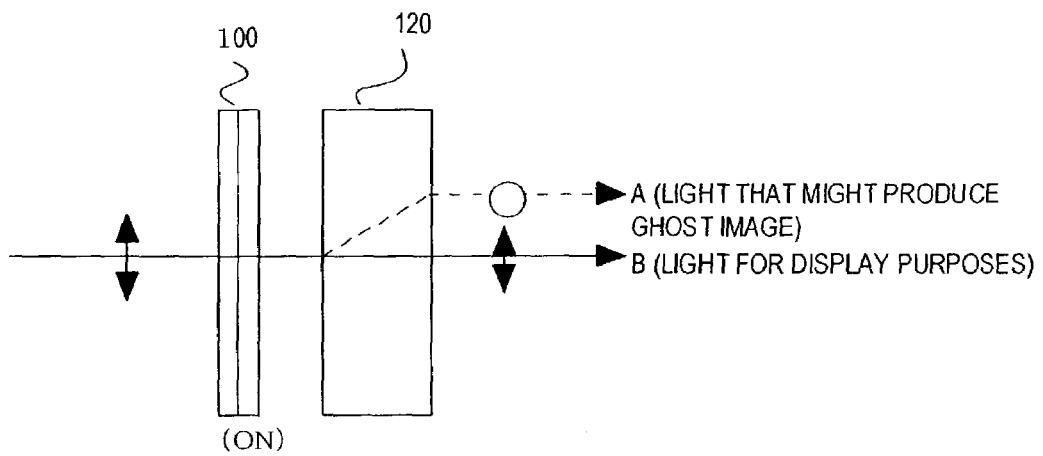

Referring to FIG. 12A, illustrated is a state in which no voltage is being applied to the liquid crystal layer of the polarization modulator 100. In this case, the polarization modulator 100 has wavelength dependence such as that shown in FIG. 10. Accordingly, some of the light ray that should have been directed toward the location A is actually directed toward the location B instead. The light ray that reaches the location A is a linearly polarized light ray having a predetermined polarization direction. On the other hand, the light ray that reaches the location B is a linearly polarized light ray of which the polarization direction defines an angle of 90 degrees with that of the linearly polarized light ray reaching the location A. In this manner, if a light ray that is not completely linearly polarized (i.e., an elliptically polarized light ray) is incident onto the birefringent element 120, then two types of linearly polarized light rays, of which the polarization directions cross each other at right angles (i.e., an ordinary ray and an extraordinary ray), go out of the birefringent element 120. Thus, the polarization modulator is ideally designed so as to eliminate the unwanted linearly polarized light ray and pass only the desired linearly polarized light ray.

Next, suppose a voltage is applied to the liquid crystal layer of the polarization modulator 100 for the purpose of shifting the image from the location A to the location B. In that case, the location that the outgoing light ray reaches shifts from the location A to the location B as shown in FIG. 12B. Meanwhile, the light ray that has been directed toward the location B before the voltage is applied to the liquid crystal layer of the polarization modulator 100 shifts to the location A. However, while the voltage is being applied to the liquid crystal layer, the transmittance of the light ray depends on the wavelength relatively lightly. Accordingly, the intensity of the light ray that reaches the location A while the voltage is applied to the liquid crystal layer is much smaller than that of the light ray that reaches the location B while no voltage is applied to the liquid crystal layer.

No matter whether or not the voltage is applied to the liquid crystal layer of the polarization modulator, the light ray that reaches the location A has the same polarization direction and the light ray that reaches the location B also has the same polarization direction. In other words, the polarization direction of the light ray that is supposed to be used for display purposes in the state shown in FIG. 12A is the same as that of the unwanted light ray that might produce a ghost image in the state shown in FIG. 12B. In the same way, the polarization direction of the light ray that is supposed to be used for display purposes in the state shown in FIG. 12B is the same as that of the unwanted light ray that might produce a ghost image in the state shown in FIG. 12A.

If a voltage is applied to the polarization corrector 40 synchronously with the application or removal of the voltage to/from the liquid crystal layer of the polarization modulator 100, then the outgoing light ray of the polarization corrector 40 switches between the polarization states shown in FIGS. 13A and 13B as already described with reference to FIGS. 4A and 4B. That is to say, the polarization direction of the outgoing light ray of the polarization corrector 40 rotates 90 degrees in response to the application or removal of the voltage. As a result, the light ray that has gone out of the polarization corrector 40 so as to be used for display purposes does not change its polarization direction, and the light ray that has gone out of the polarization corrector 40 to possibly produce a ghost image does not change its polarization direction, either, no matter where the image has been shifted.

Figure 13A:
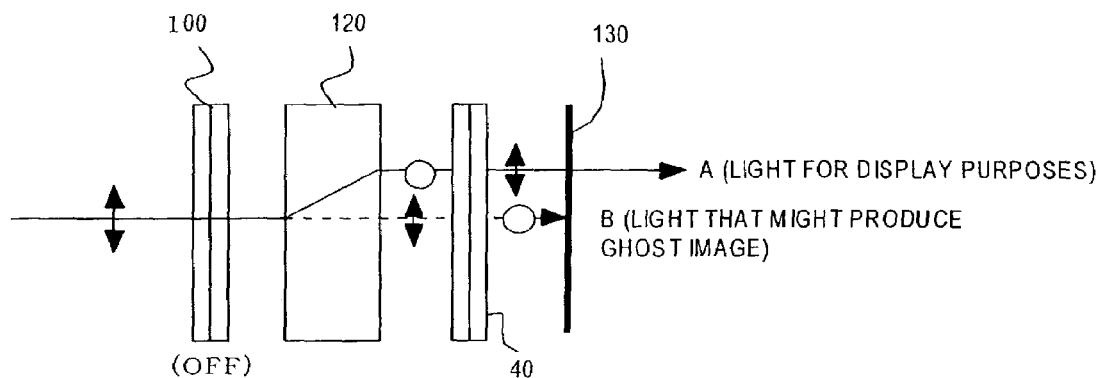
FIGS. 13A and 13B show how an optical device including a polarization regulator according to a fifth specific preferred embodiment of the present invention shifts the optical path of an incoming light ray while no voltage is being applied to the liquid crystal layer of the polarization modulator 100 and while a voltage is being applied to the liquid crystal layer of the polarization modulator 100, respectively.
Figure 13B:
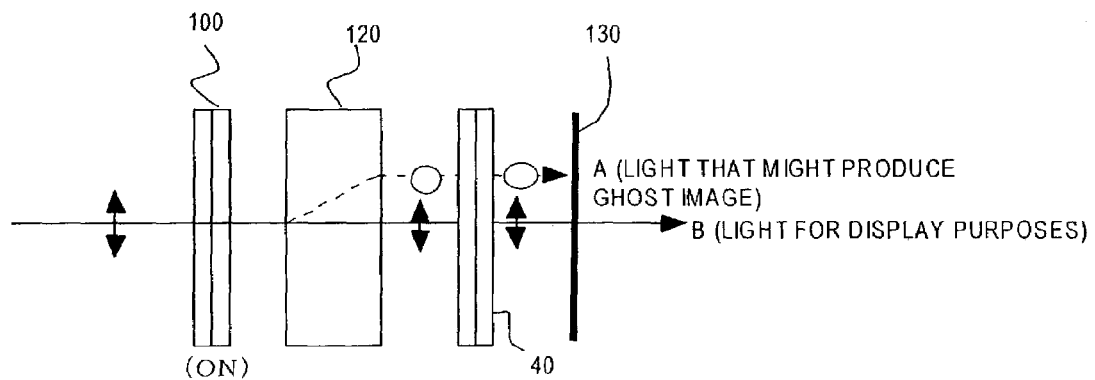

In this preferred embodiment, a polarization regulator 130 is disposed behind the polarization corrector 40 as shown in FIGS. 13A and 13B to eliminate the ghost image. This polarization regulator 130 may be implemented as a polarizer (e.g., a polarization plate or film) and has the functions of removing the unwanted polarization components, which might produce the ghost image, and transmitting only the linearly polarized light ray that is supposed to be used for display purposes. More specifically, in the example illustrated in FIGS. 13A and 13B, the polarization regulator 130 cuts the linearly polarized light ray with the polarization direction coming out of the paper but transmits the linearly polarized light ray with the polarization direction parallel to the paper. Thus, by providing this polarization regulator 130, even if elliptically polarized components have been incident onto the birefringent element 120, it is possible to eliminate the unwanted ghost image.

Embodiment 5

Figure 14:
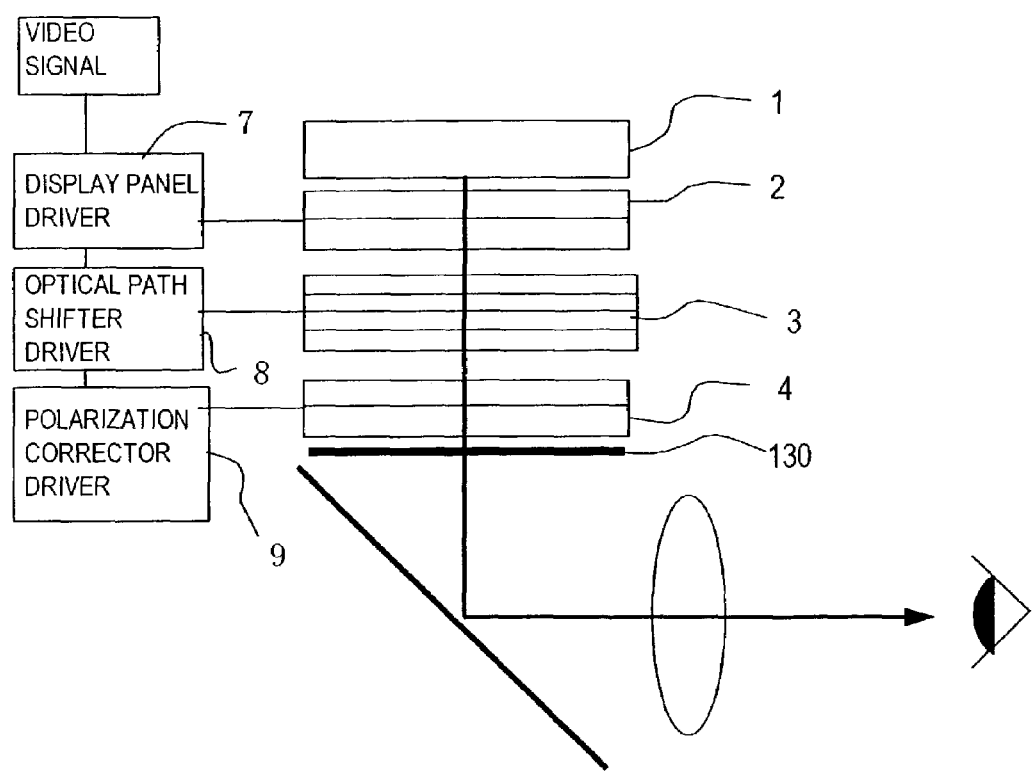
FIG. 14 is a schematic representation illustrating an optical display system according to the fifth preferred embodiment.

Hereinafter, a specific preferred embodiment of an optical display system including the optical device shown in FIGS. 13A and 13B will be described with reference to FIG. 14.

The optical display system of this preferred embodiment has almost the same configuration as the counterpart shown in FIG. 5, but additionally includes the polarization regulator 130. In this preferred embodiment, the polarization regulator 130, implemented as a polarizer, is disposed so as to receive the outgoing light ray of the polarization corrector 4 including a liquid crystal layer. Accordingly, even if elliptically polarized components have been produced due to the properties of the liquid crystal layer of the polarization corrector 4, those unwanted polarized components are appropriately removed by the polarization regulator 130. As a result, no ghost image will be produced.

The polarization regulator 130 may either form a part of, or be separated from, the polarization corrector 4. The polarization corrector 4 may be disposed at any position on the optical path of the light ray that has gone out of the optical path shifter 3. However, the optical path shifter 3, polarization corrector 4, polarization regulator 130 and driver circuits 8 and 9 are preferably integrated together as a single device because the device can be easily handled as a part of the optical display system in that case.

Embodiment 6

Figure 15:
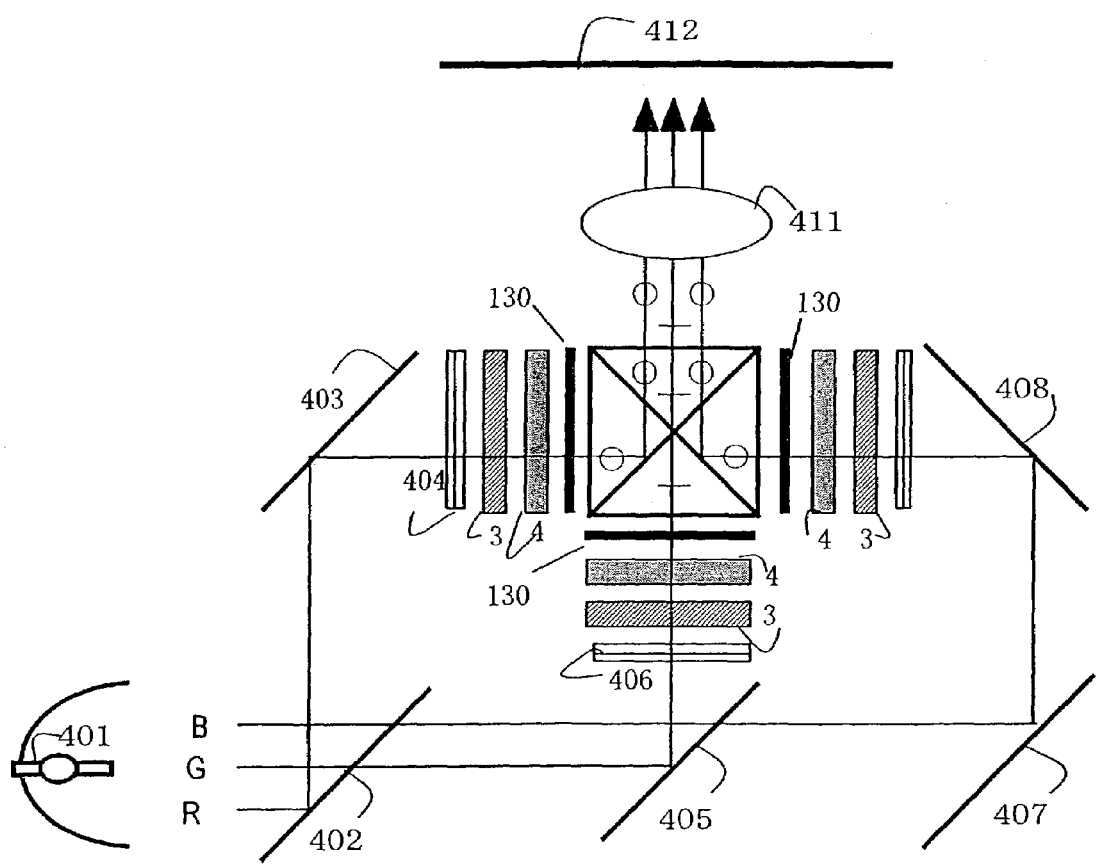
FIG. 15 is a schematic representation illustrating an optical display system according to a sixth specific preferred embodiment of the present invention.

Hereinafter, another specific preferred embodiment of an optical display system according to the present invention will be described with reference to FIG. 15. The optical display system of this preferred embodiment is the same as the counterpart of the third preferred embodiment described above except that the polarization regulator 130 is disposed on the light outgoing side of each polarization corrector 4 in this optical display system.

According to this preferred embodiment, even if non-negligible elliptically polarized components are included in the light ray that is going to enter each birefringent element, those unwanted components, which might otherwise cause a ghost image, are cut off by the polarization regulator 130 from the outgoing light ray of the birefringent element. As a result, no ghost image will be produced and the image quality can be improved.

It should be noted that almost no elliptically polarized components are produced in some wavelength range as can be seen from the transmittance characteristic shown in FIG. 10. In the example shown in FIG. 10, that wavelength range is defined by wavelengths of about 500 nm to about 550 nm and corresponds to the color green. In the optical display system shown in FIG. 15, the polarization regulator 130 is also disposed on the optical path of a green light ray. However, if the incoming light has the characteristic shown in FIG. 10, then the green light ray includes almost no elliptically polarized components that might produce a ghost image. Accordingly, in that case, the polarization regulators 130 may be disposed only on the optical paths of the red and blue light rays.

According to various preferred embodiments of the present invention described above, a polarization corrector is disposed so as to receive the outgoing light ray of an optical path shifter that displaces the optical path of an incoming light ray as the plane of polarization thereof is rotated. Thus, the outgoing light ray of the polarization corrector can maintain the same polarization state no matter where the optical path has been shifted. For that reason, even if optical members having polarization dependence are used, the variation in transmittance or reflectance among respective shift locations can be minimized. Accordingly, an optical display system including such an optical device can display an image of quality without allowing the viewer to perceive any flicker due to the image shifting.

Also, even when the optical device according to any of various preferred embodiments of the present invention is applied to a three-panel projector, R, G and B light rays that always have a particular pair of polarization directions can be incident onto a color synthesizing prism having polarization dependence. Thus, an image of quality can be obtained. Furthermore, if the polarization correctors are operated such that a P polarized green light ray and S polarized red and blue light rays are incident onto the reflective (or transmitting) planes of the color synthesizing prism, then the three light rays that have entered the color synthesizing prism can be synthesized together efficiently. Consequently, a bright image of quality can be displayed.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical device comprising an optical path shifter that includes at least one optical path shifting section,
    wherein the optical path shifting section includes:
    a polarization modulator for changing the polarization state of an incoming light ray; and
    a birefringent element for shifting the optical path of an outgoing light ray of the polarization modulator based on the polarization state of the outgoing light ray, and
    wherein the optical device further comprises a polarization corrector, which selectively changes the polarization state of an outgoing light ray of the optical path shifter, thereby keeping the polarization state of an outgoing light ray of the polarization corrector substantially unchanged no matter where the optical path has been shifted.

2. The optical device of claim 1, wherein the polarization modulator rotates the polarization direction of the incoming light ray in a selected period.

3. The optical device of claim 2, wherein an outgoing light ray of the polarization corrector is a linearly polarized light ray at least in a predetermined wavelength range and has a substantially constant polarization direction no matter where the optical path has been shifted.

4. The optical device of claim 2, further comprising a polarization regulator that transmits only a particular linearly polarized light component having a selected polarization direction on receiving the outgoing light ray of the polarization corrector.

5. The optical device of claim 1, wherein the polarization modulator comprises:
    a liquid crystal layer; and
    an electrode for applying a voltage to the liquid crystal layer.

6. The optical device of claim 1, wherein the polarization corrector comprises:
    a liquid crystal layer; and
    an electrode for applying a voltage to the liquid crystal layer.

7. The optical device of claim 1, wherein the response speed of the polarization corrector is substantially equal to that of the polarization modulator.

8. The optical device of claim 1, wherein the outgoing light ray of the polarization corrector is a circularly polarized light ray.

9. The optical device of claim 8, wherein the polarization corrector is a phase plate.

10. An apparatus comprising:
    the optical device as recited in claim 1; and
    an optical member, which is disposed so as to receive the outgoing light ray of the polarization corrector of the optical device.

11. The apparatus of claim 10, wherein the transmittance and/or reflectance of the optical member has polarization dependence.

12. The apparatus of claim 10, wherein the optical member selectively transmits or reflects a light ray that falls within a particular wavelength range.

13. The optical display system of claim 12, further comprising:
    a color separating optical system for splitting the light ray, emitted from the light source, into red, green and blue light rays;
    color synthesizing means for synthesizing the red, green and blue light rays together; and
    projecting means for projecting the synthesized light ray that has gone out of the color synthesizing means,
    wherein the display panel, the optical path shifter and the polarization corrector are disposed on the optical path of each of the red, green and blue light rays, and
    wherein the optical path shifters and the polarization correctors are located between the display panels and the color synthesizing means.

14. The optical display system of claim 13, wherein an outgoing light ray of the polarization corrector for the green light ray is a linearly polarized light ray that is substantially P polarized with respect to a color synthesizing plane of the color synthesizing means, and
    wherein outgoing light rays of the two polarization correctors for the red and green light rays are S polarized light rays, which have a polarization direction that defines an angle of approximately 90 degrees with that of the outgoing light ray of the polarization corrector for the green light ray.

15. The optical display system of claim 14, comprising at least one polarization regulator that selectively transmits at least one of the outgoing light rays of the polarization correctors, the at least one light ray transmitted being a particular linearly polarized light ray having a selected polarization direction.

16. The optical display system of claim 15, wherein the polarization regulator is disposed on the optical path of each of the red and blue light rays but not disposed on the optical path of the green light ray.

17. An optical display system comprising:
    a light source, which emits a light ray;
    a display panel, which modulates the light ray, emitted from the light source, in response to a signal; and
    an optical path shifter, which is disposed at such a position as to receive an outgoing light ray of the display panel and which optically displaces an image, which has been displayed on the display panel, on a frame-by-frame basis,
    wherein the optical path shifter includes at least one shifting section,
    the shifting section includes:
    a polarization modulator for changing the polarization state of the outgoing light ray of the display panel; and
    a birefringent element for shifting the optical path of an outgoing light ray of the polarization modulator based on the polarization state of the outgoing light ray, and
    wherein the optical display system further comprises a polarization corrector, which selectively changes the polarization state of an outgoing light ray of the optical path shifter, thereby keeping the polarization state of an outgoing light ray of the polarization corrector substantially unchanged no matter where the optical path has been shifted.

18. The optical display system of claim 17, wherein the polarization modulator rotates the polarization direction of the outgoing light ray of the display panel in a selected period.

19. The optical display system of claim 17, wherein an outgoing light ray of the polarization corrector is a linearly polarized light ray at least in a predetermined wavelength range and has a substantially constant polarization direction no matter where the optical path has been shifted.

20. The optical display system of claim 19, further comprising a polarization regulator that transmits only a particular linearly polarized light component having a selected polarization direction on receiving the outgoing light ray of the polarization corrector.

21. The optical display system of claim 17, wherein the polarization modulator comprises:
   a liquid crystal layer; and
   an electrode for applying a voltage to the liquid crystal layer.

22. The optical display system of claim 17, wherein the polarization corrector comprises:
   a liquid crystal layer; and
   an electrode for applying a voltage to the liquid crystal layer.

23. The optical display system of claim 17, wherein the response speed of the polarization corrector is substantially equal to that of the polarization modulator.

24. The optical display system of claim 17 wherein the outgoing light ray of the polarization corrector is a circularly polarized light ray.

25. The optical display system of claim 20, wherein the polarization corrector is a phase plate.

26. An optical device comprising at least one optical path shifting section including:
   a polarization modulator having a first operating state for selectively changing the polarization state of an incoming light ray and a second operating state;
   a birefringent element shifting the optical path of an outgoing light ray of the polarization modulator having a given polarization state; and
   a polarization corrector selectively changing the polarization state of said outgoing light ray from the birefringent element based on whether said polarization modulator is in the first operating state or the second operating state.

* * * * *